(12) United States Patent
Pal

(10) Patent No.: US 9,729,020 B2
(45) Date of Patent: Aug. 8, 2017

(54) MOTOR STATOR HAVING CHANNELS USED FOR COOLING AND METHOD OF PROVIDING THE CHANNELS

(75) Inventor: Debabrata Pal, Hoffman Estates, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 845 days.

(21) Appl. No.: 13/053,297

(22) Filed: Mar. 22, 2011

(65) Prior Publication Data

US 2012/0242176 A1    Sep. 27, 2012

(51) Int. Cl.
*H02K 3/24* (2006.01)
*H02K 1/20* (2006.01)
*H02K 7/14* (2006.01)

(52) U.S. Cl.
CPC .............. *H02K 3/24* (2013.01); *H02K 1/20* (2013.01); *H02K 7/14* (2013.01); *Y10T 29/49009* (2015.01)

(58) Field of Classification Search
CPC .............. H02K 3/24; H02K 1/32; H02K 9/22
USPC ................. 310/52, 54, 65, 214, 215
See application file for complete search history.

(56) References Cited

U.S. PATENT DOCUMENTS

| 2,891,391 | A |   | 6/1959  | Kocher et al. |
|-----------|---|---|---------|---------------|
| 3,430,085 | A |   | 2/1969  | Mains |
| 3,801,843 | A |   | 4/1974  | Corman et al. |
| 4,380,712 | A |   | 4/1983  | Intichar et al. |
| 4,432,135 | A | * | 2/1984  | Greenlee ............ 29/598 |
| 4,473,765 | A | * | 9/1984  | Butman et al. ............ 310/215 |
| 4,496,862 | A |   | 1/1985  | Weber |
| 4,994,700 | A | * | 2/1991  | Bansal et al. ............ 310/215 |
| 5,523,635 | A |   | 6/1996  | Ferreira et al. |
| 6,661,124 | B1 | * | 12/2003 | Seki et al. ............ 310/12.21 |
| 6,661,133 | B2 | * | 12/2003 | Liebermann ............ 310/58 |
| 6,661,146 | B2 | * | 12/2003 | Oohashi et al. ............ 310/180 |
| 6,798,097 | B2 |   | 9/2004  | Pullen et al. |
| 6,798,105 | B1 | * | 9/2004  | Nilson ............ 310/179 |
| 6,856,053 | B2 | * | 2/2005  | LeFlem et al. ............ 310/54 |
| 7,019,429 | B1 | * | 3/2006  | Larsson et al. ............ 310/215 |
| 7,208,854 | B1 |   | 4/2007  | Saban et al. |
| 7,242,119 | B2 | * | 7/2007  | Gomes De Lima ............ 310/52 |
| 7,498,711 | B2 | * | 3/2009  | Biais ............ 310/214 |
| 7,705,495 | B2 |   | 4/2010  | Alfermann et al. |

FOREIGN PATENT DOCUMENTS

| EP | 0684682    | 11/1995 |
|----|------------|---------|
| GB | 1020952    | 2/1966  |
| JP | 2003250239 | 9/2003  |

OTHER PUBLICATIONS

European Search Report for Application No. 12160225.4 dated Nov. 10, 2016.
Extended European Search Report and Written Opinion for Application No. 12160225.4 dated May 25, 2016.

* cited by examiner

*Primary Examiner* — Thomas Truong
(74) *Attorney, Agent, or Firm* — Carlson, Gaskey & Olds, P.C.

(57) ABSTRACT

An example stator assembly includes a stator for establishing a core side of a channel. A plurality of stator windings are secured relative to portions of the stator core. The plurality of stator windings establish a winding side of the channel. At least a portion of the channel is configured to communicate a cooling fluid from a first axial end of the stator core to an opposing axial end of the stator core.

17 Claims, 4 Drawing Sheets

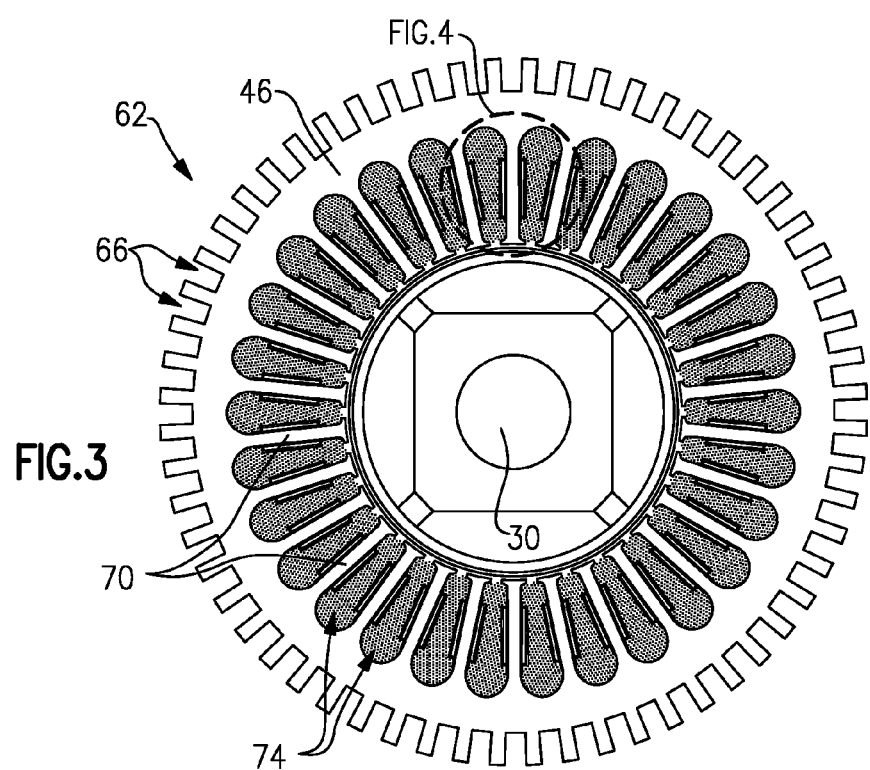
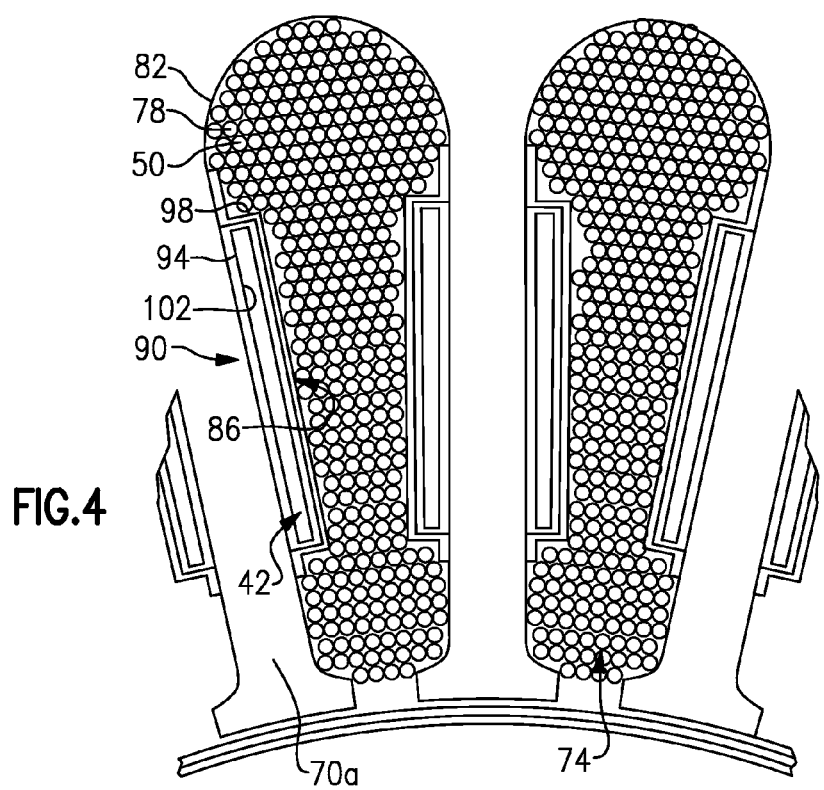

MOTOR STATOR HAVING CHANNELS USED FOR COOLING AND METHOD OF PROVIDING THE CHANNELS

BACKGROUND

This disclosure relates to a motor and, more particularly, to channels within a stator of the motor. The channels are used to communicate a fluid that cools the motor.

Motors are used in many industries and environments. A single aircraft, for example, typically includes several motors. Some of the motors may drive compressors that pressurize cabin air. Other motors may drive fans that cool the aircraft. Motors include stators and rotors as is known. The stator includes windings secured to a stator core.

Motors generate thermal energy during operation. Significant thermal energy can damage motors and surrounding components. Some motors are air cooled to remove thermal energy. In such motors, air is communicated through the motor's end windings and through channels established in a back iron of the motor. Communicating air through these areas of the motor ineffectively removes enough thermal energy from some motors, particularly motors operating at relatively high power densities that generate significant thermal energy. Motors used to drive ram fans often operate at high power densities.

SUMMARY

An example stator assembly includes a stator establishing a core side of a channel. Stator windings are secured relative to portions of the stator core. The stator windings establish a winding side of the channel. At least a portion of the channel is configured to communicate a cooling fluid from a first axial end of the stator core to an opposing axial end of the stator core.

An example aircraft motor assembly includes a rotor having a rotational axis. A stator core has an array of teeth extending radially relative to the rotational axis. Stator windings are secured relative to the teeth. Cooling channels are established between the teeth and the stator windings. The cooling channels are distributed circumferentially about the axis.

An example method of providing a stator cooling channel includes securing a spacer relative to a tooth of a stator and securing a plurality of windings relative to the spacer and the tooth. The method then removes the spacer after the winding. The end windings may be formed after the spacer has been removed.

DESCRIPTION OF THE FIGURES

The various features and advantages of the disclosed examples will become apparent to those skilled in the art from the detailed description. The figures that accompany the detailed description can be briefly described as follows:

FIG. 3 shows a section view at line 3-3 of the FIG. 2 stator.

FIG. 4 shows a close-up view of an area of FIG. 3.

DETAILED DESCRIPTION

Figure 1:
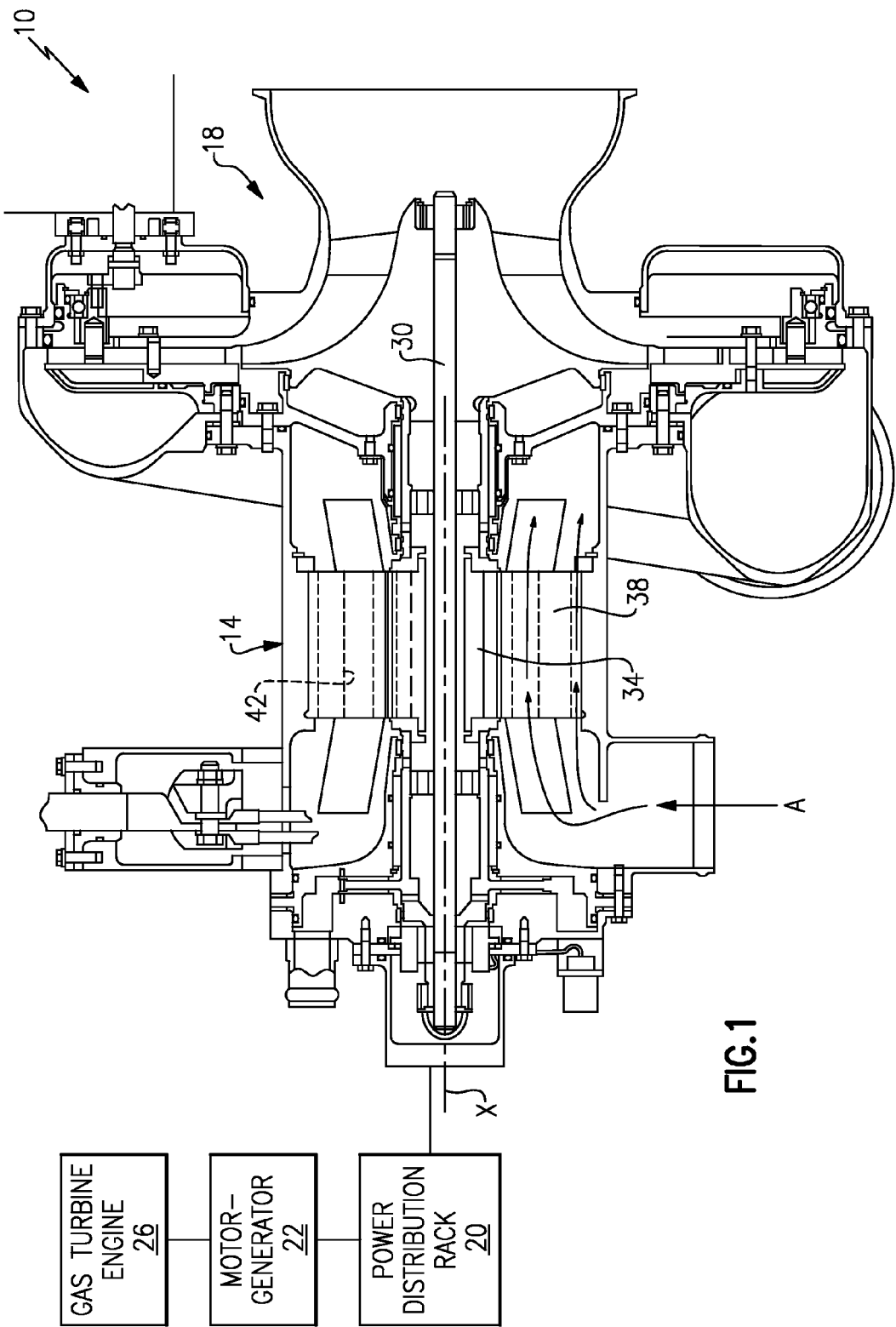
FIG. 1 shows a section view of an example motor driven compressor assembly.

Referring to FIG. 1, an example motor driven compressor assembly 10 is used within an aircraft. The motor driven compressor 10 includes a motor 14 and a compressor 18. The example motor driven compressor 10 receives power from a motor generator 22. The power is communicated to the motor driven compressor 10 through a power distribution rack 20. The motor generator 22 is powered by a gas turbine engine 26 of the aircraft. When powered, the motor 14 rotatably drives a shaft 30 that rotates portions of the compressor 18 to compress air in a known manner. The motor 14 may be a permanent magnet motor, an induction motor, or some other type of motor.

The example motor 14 includes a rotor 34 that rotates with the shaft 30. The motor 14 also includes a stator assembly 38. A channel 42 is established within the stator assembly 38. The channel 42 is configured to communicate a cooling flow of air A through portions of the stator assembly 38. The air A carries thermal energy away from the motor 14 as the air A communicates through the channel 42. Communicating thermal energy away from the motor 14 cools the motor 14. Fluids other than air are used in some examples to remove thermal energy from the motor 14.

Figure 2:
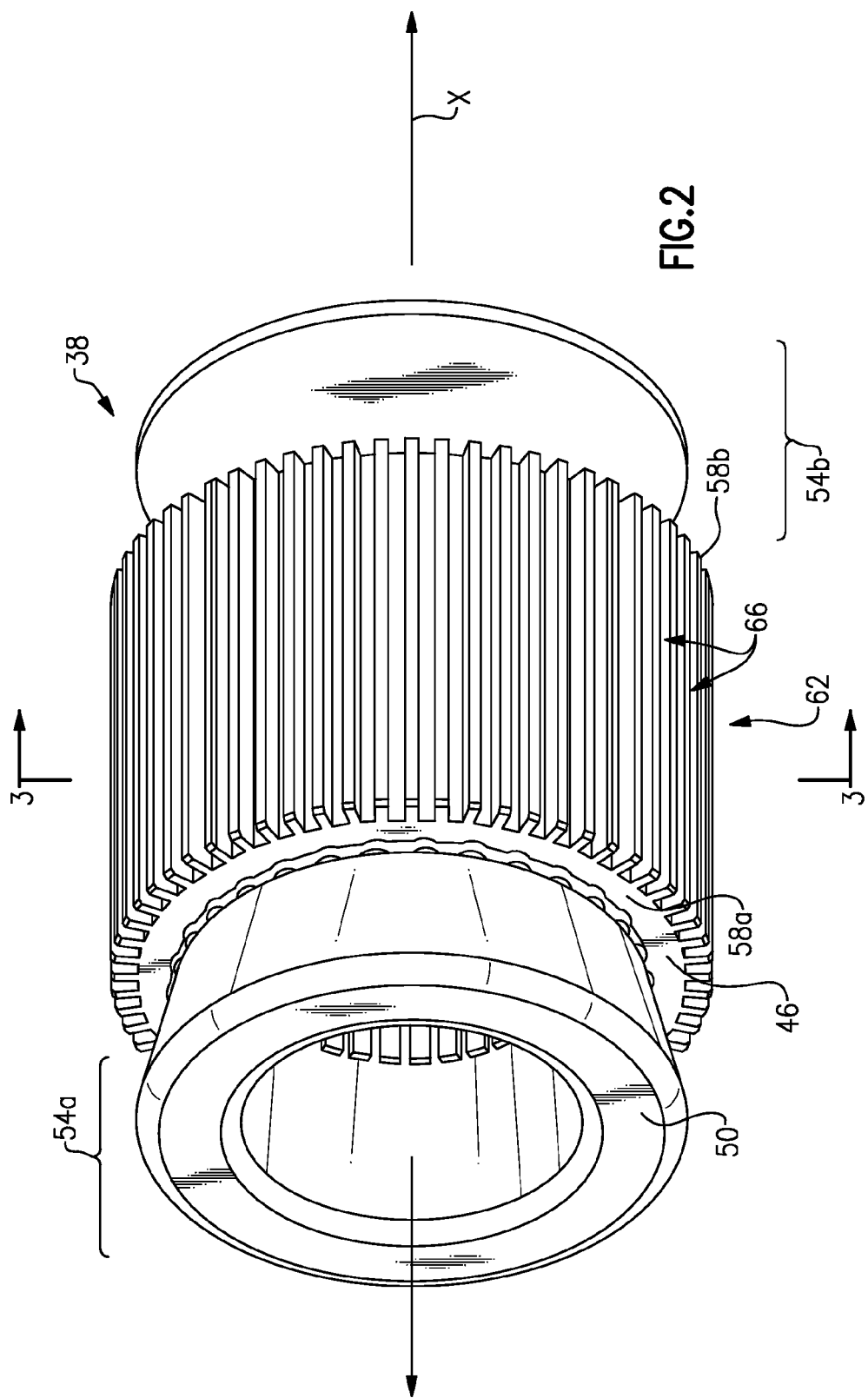
FIG. 2 shows a perspective view of a stator from the FIG. 1 assembly.

Referring now to FIGS. 2-4, the example stator assembly 38 includes a stator core 46 and a plurality of windings 50. The stator core 46 is rotatable about an axis X. The stator core 46 is made of a Hiperco 50 or M19 materials, for example.

A portion of the windings 50 extends axially past a first axial end 58*a* of the stator core 46. Another portion of the windings 50 extends axially past a second axial end 58*b* of the stator core 46. These portions of the windings 50 extending axially past ends of the stator core 46 are referred to as end windings 54*a* and 54*b*.

In this example, the end windings 54*a* and 54*b* of FIG. 2 are shown in schematic form for clarity. A person having skill in this art and the benefit of this disclosure will understand that the example end windings 54*a* and 54*b* include multiple bundles of individual wires.

The stator core 46 includes a back iron portion 62 that establishes a plurality of back iron channels 66. In this example, a flow of air communicates through the back iron channels 66 in addition to the portion of the channel 42. In this example, coolant flows axially through the end windings 54*a*, then through the channels 42 and back iron channels 66. The coolant then flows through the end windings 54*b*.

The stator core 46 includes an array of teeth 70 directed radially inward toward the shaft 30. Slots 74 are established between adjacent teeth 70. The slots 74 house a central portion 78 of the windings 50. The windings 50 include multiple individual wires 82 positioned near one another within the slot 74. The example wires are insulated copper wires.

In this example, the windings 50 establish a first side 86 of the channel 42. The stator core 46, and particularly the tooth 70*a*, establishes an opposing, second side 90 of the channel 42. In this example, the channel 42 is established exclusively with the windings 50 and the stator core 46. That is, no other portions of the motor 14 are used to establish the example channel 42. As shown, other channels are distributed circumferentially about the axis X.

In this example, a shell 94 is used to provide the example channel 42. The shell is separated from the windings 50 by a layer of Nomex 98. The example shell 94 is made of a metal. Other examples may include a shell made of ceramic, Nomex, ULTEM plastic, or other materials. Notably, if the shell 94 is made of Nomex, the Nomex layer 98 may not be required.

Figure 5:
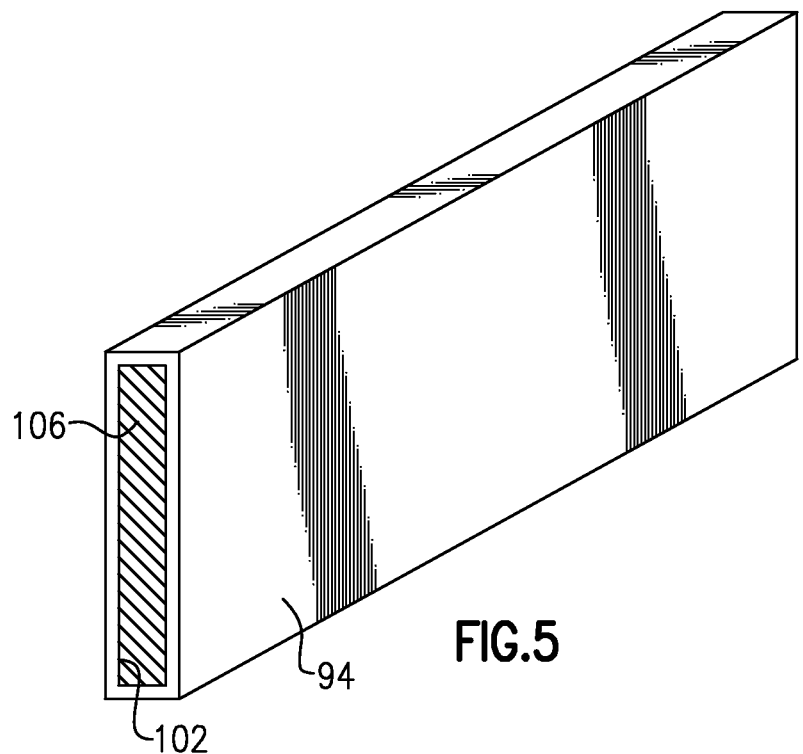
FIG. 5 shows a channel mold used to establish a channel in the FIG. 2 stator.

Referring now to FIG. 5 with continuing reference to FIGS. 2-4, the example shell 94 establishes an aperture 102 that is configured to hold a spacer 106. The example spacer 106 is held within the shell 94 during assembly of the stator assembly 38, and specifically when the windings 50 are installed within the slot 74.

The spacer 106 is removed from the shell prior to completing assembly of the stator assembly 38. For example, prior to forming the end windings 54a and 54b. The spacer 106 is made from a Nomex material in this example. Other example spacers are made from other materials, such as metals or plastics.

To assemble the stator assembly 38, the spacer 106 within the shell 94 is positioned against one of the teeth 70 of the stator core 46, such as the tooth 70a. The shell 94 may be secured to the tooth 70a using an adhesive.

After securing the shell 94, the Nomex layer 98 is then placed over the shell 94 and a portion of the tooth 70a. Wires 82 of the central portion 78 of the windings 50 are then positioned within the slots 74. A manual or an automatic process may be used to position the wires 82 within the slots 74. The shell 94 prevents the wires 82 from filling the channel 42. The spacer 106 helps maintain the integrity of the shell 94 as the wires 82 are moved into the slot 74. In this example, the shell 94 is positioned within the channel 42, which is defined by the sides 86 and 90.

After the wires 82 are positioned within the slot 74, the spacer 106 is pushed axially out of the shell 94. The end windings 54a and 54b are then formed, and the stator assembly 38 is impregnated. Removing the spacer 106 from the channel 42 opens a path (within the channel 42) for air to communicate between the windings 50 and the stator core 46.

In some examples, the spacer 106 is not pushed axially from out of the shell 94 and is instead melted away during the impregnation process, which can heat the spacer to around 250° F.-300° F. (125° C-150 ° C.).

In some examples, the shell 94 is also removed with the spacer 106. In such an example, the entire channel 42 is able to communicate air, rather than having a portion of the channel 42 obstructed by the shell 94.

Other examples rely exclusively on the spacer 106 to establish the channel 42 rather than both the shell 94 and the spacer 106. In such an example, the spacer may be pushed from between the wires 82 and the tooth 70a, or melted away. Other spacers may be removed using other techniques.

Figure 6:
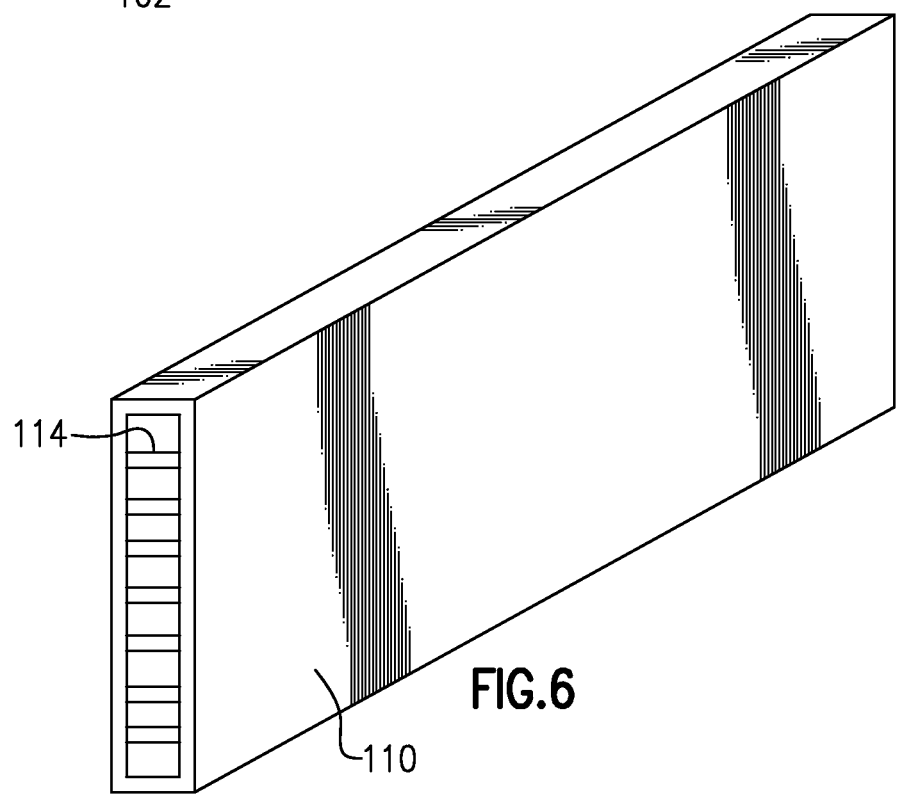
FIG. 6 shows another example channel mold that may be used to establish a channel in the FIG. 2 stator.

Referring to FIG. 6, another example shell 110 includes a plurality of circumferentially extending fins 114. The example shell 110 remains with the stator assembly 38 and is not removed. The fins 114 of the example shell 110 facilitate the flow of air through the channel 42 and enhance the structural integrity of the shell 110. Notably, the fins 114 are not removed from other portions of the shell 110. Further, the shell 110 may not require a spacer (such as the spacer 106) to maintain the integrity of the shell 110 during insertion of the wires 82 within the slot 74 of the stator core 46. In addition, the fins 114 provide extended surface area to enhance heat transfer from stator core and winding to the coolant.

Features of the disclosed examples include providing a path for communicating a cooling fluid through areas of the stator assembly. The air communicating through the path in the disclosed areas more effectively removes thermal energy from a motor than previous communication paths within motors.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A stator assembly, comprising:
a stator core establishing a core side of a channel; and
a plurality of stator windings secured relative to portions of the stator core, the plurality of stator windings establishing a winding side of the channel, wherein at least a portion of the channel is configured to communicate a cooling fluid from a first axial end of the stator core to an opposing, second axial end of the stator core, wherein the channel has a channel perimeter and the channel perimeter is established exclusively by the stator core and the plurality of stator windings, wherein the channel perimeter is established by the stator core and the plurality of stator windings about an entire circumference of the channel perimeter.

2. The stator assembly of claim 1, wherein the stator core comprises a plurality of radially extending teeth, and one of the plurality of radially extending teeth is configured to establish the core side.

3. The stator assembly of claim 2, wherein another side of the one of the plurality of radially extending teeth establishes a second core side of a second channel.

4. The stator assembly of claim 1, wherein the stator core comprises a plurality of radially extending teeth, each of the teeth establishing at least one core side for the channel.

5. The stator assembly of claim 1, including a plurality of channels distributed circumferentially about the stator assembly.

6. The stator assembly of claim 1, wherein the plurality of stator windings are impregnated.

7. The stator assembly of claim 6, wherein the plurality of stator windings establishing the winding side of the channel are impregnated.

8. The stator assembly of claim 1, including an insulator received within the channel perimeter.

9. A stator assembly, comprising:
a stator core establishing a core side of a channel;
a plurality of stator windings secured relative to portions of the stator core, the plurality of stator windings establishing a winding side of the channel, wherein at least a portion of the channel is configured to communicate a cooling fluid from a first axial end of the stator core to an opposing, second axial end of the stator core; and
a shell that blocks movement of the plurality of stator windings into the channel, the shell positioned entirely within the channel, the shell providing an aperture positioned entirely within the channel, wherein the channel has a channel perimeter and the channel perimeter is established exclusively by the stator core and the plurality of stator windings, the stator core and at least some of the plurality of stator windings in direct contact with each other.

10. The stator assembly of claim 9, including a layer of polymer positioned between the shell and the winding side of the channel.

11. The stator assembly of claim 9, wherein the shell comprises at least one circumferentially extending fin.

12. The stator assembly of claim 11, wherein the fin connects opposing circumferential sides of the shell.

13. The stator assembly of claim 9, wherein the shell has a polygonal cross-sectional profile.

14. The stator assembly of claim 9, wherein the shell is a metallic shell.

15. A stator assembly, comprising:
   a stator core establishing a core side of a channel; and
   a plurality of stator windings secured relative to portions of the stator core, the plurality of stator windings establishing a winding side of the channel, wherein at least a portion of the channel is configured to communicate a cooling fluid from a first axial end of the stator core to an opposing, second axial end of the stator core, wherein the channel has a channel perimeter and the channel perimeter is established exclusively by the stator core and the plurality of stator windings, wherein at least a portion of the stator core establishing the core side directly contacts at least some of the plurality of windings establishing the winding side.

16. The stator assembly of claim 15, wherein the portion of the stator core and the at least some of the plurality of windings directly contact each other on opposing radial sides of the channel.

17. The stator assembly of claim 15, wherein the plurality of windings contacting the stator core have a circular cross-section, and an outer perimeter of the circular cross-section has a portion contacting the stator core.

\* \* \* \* \*

UNITED STATES PATENT AND TRADEMARK OFFICE
CERTIFICATE OF CORRECTION

PATENT NO. : 9,729,020 B2
APPLICATION NO. : 13/053297
DATED : August 8, 2017
INVENTOR(S) : Debabrata Pal It is certified that error appears in the above-identified patent and that said Letters Patent is hereby corrected as shown below:

In the Claims

In Claim 1, Column 4, Line 25; before "the plurality of stator" replace "and" with --or--

Signed and Sealed this
Twenty-fourth Day of July, 2018

Andrei Iancu
*Director of the United States Patent and Trademark Office*